(12) United States Patent
Mitchell et al.

(10) Patent No.: US 11,133,020 B2
(45) Date of Patent: Sep. 28, 2021

(54) ASSISTIVE TECHNOLOGY

(71) Applicant: Audio Analytic Ltd, Cambridgeshire (GB)

(72) Inventors: Christopher James Mitchell, Cambridgeshire (GB); Sacha Krstulovic, Cambridgeshire (GB); Cagdas Bilen, Cambridgeshire (GB); Neil Cooper, Cambridgeshire (GB); Julian Harris, Cambridgeshire (GB); Amoldas Jasonas, Cambridgeshire (GB); Joe Patrick Lynas, Cambridgeshire (GB)

(73) Assignee: AUDIO ANALYTIC LTD, Cambridgeshire (GB)

( * ) Notice: Subject to any disclaimer, the term of this patent is extended or adjusted under 35 U.S.C. 154(b) by 0 days.

(21) Appl. No.: 16/594,274

(22) Filed: Oct. 7, 2019

(65) Prior Publication Data
US 2021/0104255 A1    Apr. 8, 2021

(51) Int. Cl.
| | | |
|---|---|---|
| *G10L 25/51* | (2013.01) | |
| *G10L 25/30* | (2013.01) | |
| *G08B 23/00* | (2006.01) | |
| *G06N 20/00* | (2019.01) | |
| *G06N 3/08* | (2006.01) | |
| *G06N 3/04* | (2006.01) | |
| *G06N 7/00* | (2006.01) | |
| *G06N 5/00* | (2006.01) | |
| *G08B 6/00* | (2006.01) | |
| *G08B 3/10* | (2006.01) | |
| *G08B 5/22* | (2006.01) | |

(52) U.S. Cl.
CPC ............... *G10L 25/51* (2013.01); *G06N 3/04* (2013.01); *G06N 3/08* (2013.01); *G06N 5/003* (2013.01); *G06N 7/005* (2013.01); *G06N 20/00* (2019.01); *G08B 23/00* (2013.01); *G10L 25/30* (2013.01); *G08B 3/10* (2013.01); *G08B 5/22* (2013.01); *G08B 6/00* (2013.01)

(58) Field of Classification Search
CPC ......... G10L 25/51; G10L 25/30; G06N 20/00; G06N 3/04; G06N 3/08; G06N 5/003; G06N 7/005; G08B 23/00; G08B 3/10; G08B 5/22; G08B 6/00
See application file for complete search history.

(56) References Cited

U.S. PATENT DOCUMENTS

| | | | |
|---|---|---|---|
| 2016/0150338 A1* | 5/2016 | Kim | G08B 21/0208 381/58 |
| 2016/0381450 A1* | 12/2016 | Taite | G08B 3/10 381/74 |
| 2017/0105080 A1* | 4/2017 | Das | H04R 29/00 |
| 2019/0180735 A1* | 6/2019 | McElhaney | G10L 15/265 |

* cited by examiner

*Primary Examiner* — Andrew L Sniezek
(74) *Attorney, Agent, or Firm* — Tarolli, Sundheim, Covell & Tummino LLP

(57) ABSTRACT

A device or system is provided which is configured to detect one or more sound events and/or scenes associated with a predetermined context, and to provide an assistive output on fulfilment of that context.

17 Claims, 5 Drawing Sheets

ASSISTIVE TECHNOLOGY

FIELD

The present disclosure generally relates to providing an assistive facility to a user on the basis of context determined from non-verbal cues.

BACKGROUND

Background information on sound recognition systems and methods can be found in the applicant's PCT application WO2010/070314, which is hereby incorporated by reference in its entirety.

The present applicant has recognised the potential for new applications of sound recognition systems.

SUMMARY

Technology is being widely adopted for providing assistance to users in their daily lives. It has become commonplace for users to deploy assistive technology as a source of information, or to provide prompts or reminders for them to perform certain tasks.

For instance, in a home environment, a computerised assistant device may be deployed, which implements facilities to provide reminders, in the form of a display, an audible alarm, a haptic stimulation or computer generated speech, to a user, as per a schedule. Further, or alternatively, such a device may provide a facility to automate a particular action. So, for example, an assistant device may issue instructions for implementation by a suitably cooperative device, to turn house lighting on or off, or to open or close curtains, or to generate a sound output intended to rouse a sleeping human. Such actions may be pre-scheduled by a user of the device.

For instance, in an automotive environment, it is well known to provide a navigation system intended to provide graphical and audible instructions to a driver so as to reach a destination as efficiently as possible. Such instructions may adapt to information as to road traffic conditions or other criteria.

In general terms, a device or system is provided which is configured to detect one or more sound events and/or scenes associated with a predetermined context, and to provide an assistive output on fulfilment of that context.

Aspects of the disclosure provide a computer device operable to generate an assistive output on the basis of a context determination, the device comprising an audio stream acquisition unit for acquiring a stream of audio samples, a sound detector for detecting, on the stream of audio samples, one or more non-verbal sound identifiers, each non-verbal sound identifier identifying a non-verbal sound signature on the stream of audio samples, a context determiner for determining, on the basis of detection of one or more indicative non-verbal sound identifiers, that a particular context has been fulfilled and, on the basis of the context, generating an assistive output.

Aspects of the disclosure provide a computer device which is capable of determining, from identifiable non-verbal sound and/or scenes on an audio input stream, whether a predetermined context has been fulfilled and thus to generate an assistive response for that context.

Whether a context has been fulfilled may be determined in a variety of ways. In one simple example, a single instance of a particular sound event may cause fulfilment of a context. Combinations of sound events may fulfil a context. More complex combinatory approaches may further be used to determine fulfilment of a context. Fulfilment of a context may be with regard to a context model. A context model may comprise a processing network model, such as a neural network, or a decision tree, which may have been developed using machine learning on training data consisting of "valid" combinations of sound events to be associated with a particular context. Machine learning may be adaptive—in use, the device may acquire further training from user feedback in response to potentially erroneous responses to real data.

It will be appreciated that the functionality of the devices described herein may be divided across several modules. Alternatively, the functionality may be provided in a single module or a processor. The or each processor may be implemented in any known suitable hardware such as a microprocessor, a Digital Signal Processing (DSP) chip, an Application Specific Integrated Circuit (ASIC), Field Programmable Gate Arrays (FPGAs), GPU (Graphical Processing Unit), TPU (Tensor Processing Unit) or NPU (Neural Processing Unit) etc. The or each processor may include one or more processing cores with each core configured to perform independently. The or each processor may have connectivity to a bus to execute instructions and process information stored in, for example, a memory.

The invention further provides processor control code to implement the above-described systems and methods, for example on a general purpose computer system, on a digital signal processor (DSP) or on a specially designed math acceleration unit such as a Graphical Processing Unit (GPU) or a Tensor Processing Unit (TPU). The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Embodiments will now be described by way of example only.

Figure 1:
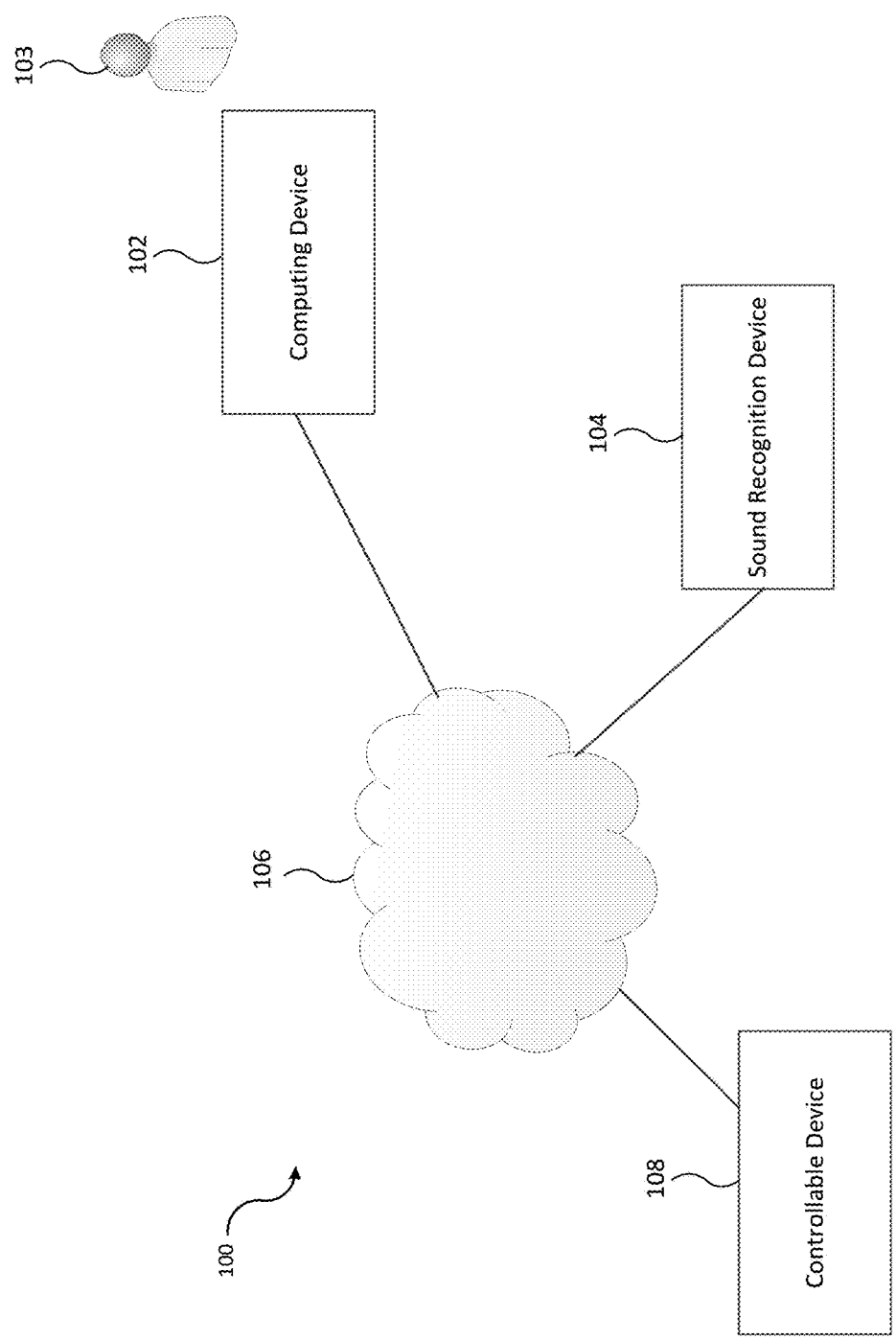
FIG. 1 shows a block diagram of example devices in a monitored environment.

FIG. 1 shows a computing device 102 in a monitored environment 100 which may be an indoor space (e.g. a house, a gym, a shop, a railway station etc.), an outdoor space or in a vehicle.

The network 106 may be a wireless network, a wired network or may comprise a combination of wired and wireless connections between the devices.

As described in more detail below, the computing device 102 may perform audio processing to recognise, i.e. detect, a target sound in the monitored environment 100. In alternative embodiments, a sound recognition device 104 that is external to the computing device 102 may perform the audio processing to recognise a target sound in the monitored environment 100 and then alert the computing device 102 that a target sound has been detected.

Figure 2:
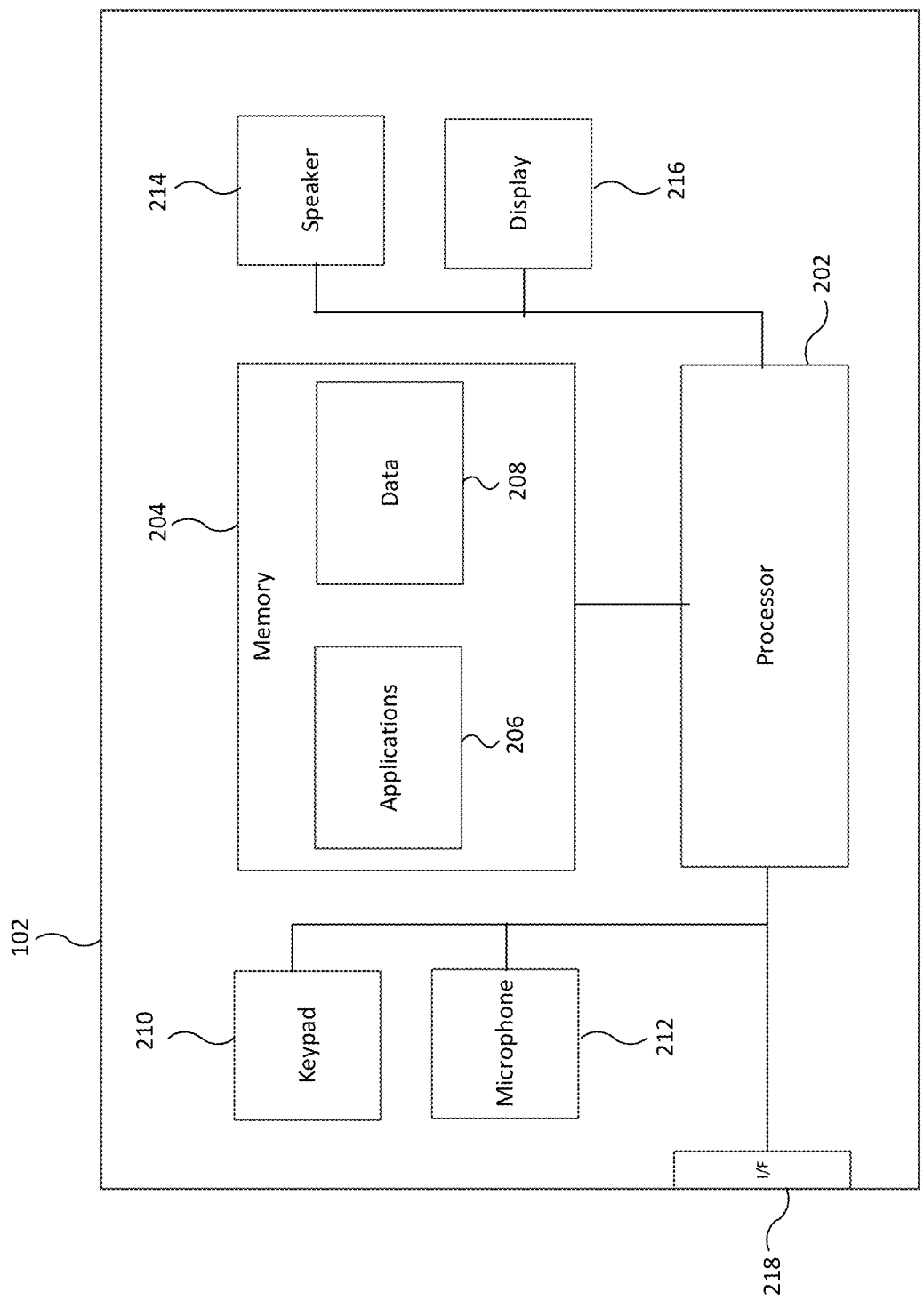
FIG. 2 shows a block diagram of a computing device.

FIG. 2 shows a block diagram of the computing device 102. It will be appreciated from the below that FIG. 2 is merely illustrative and the computing device 102 of embodiments of the present disclosure may not comprise all of the components shown in FIG. 2.

The computing device 102 may be a PC, a mobile computing device such as a laptop, smartphone, tablet-PC, a consumer electronics device (e.g. a smart speaker, TV, headphones, wearable device etc.), or other electronics device (e.g. an in-vehicle device). The computing device 102 may be a mobile device such that a user 103 can move the computing device 102 around the monitored environment. Alternatively, the computing device 102 may be fixed at a location in the monitored environment (e.g. a panel mounted to a wall of a home). Alternatively, the device may be worn by the user by attachment to or sitting on a body part or by attachment to a piece of garment.

Figure 3:
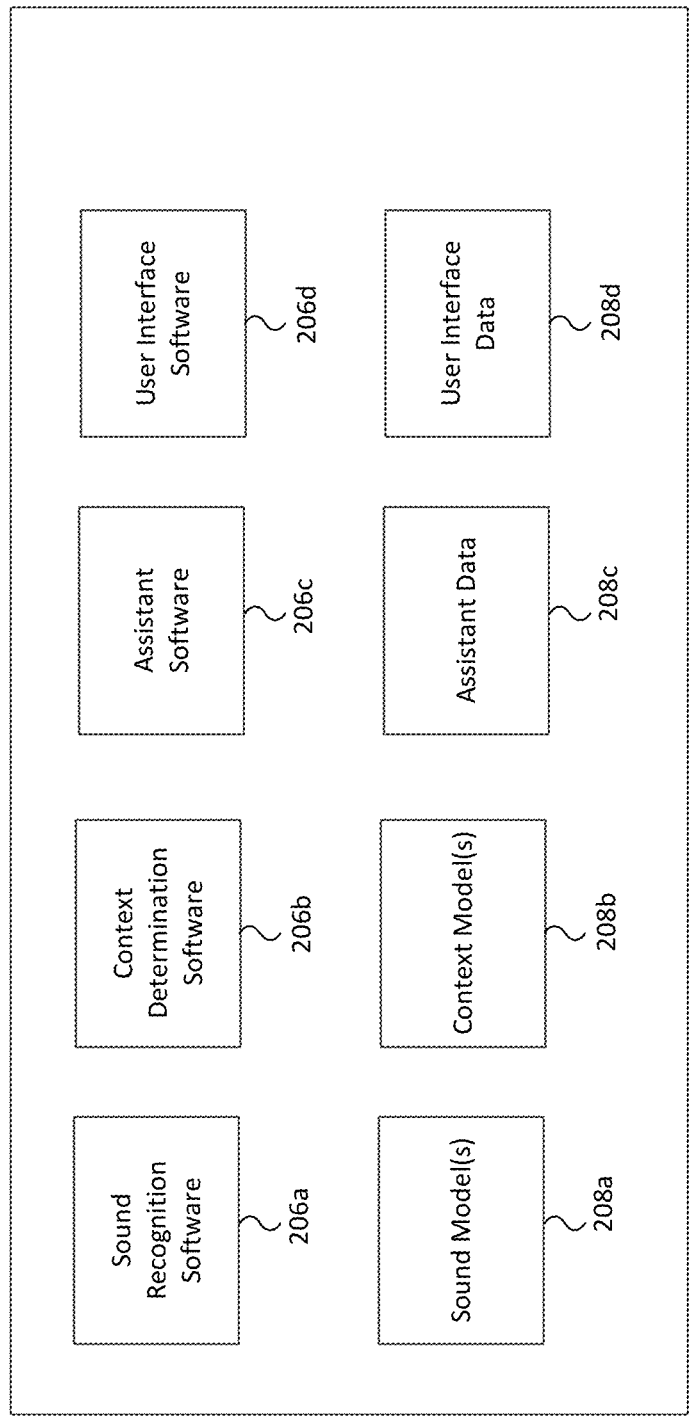
FIG. 3 shows a block diagram of software implemented on the computing device.

The computing device 102 comprises a processor 202 coupled to memory 204 storing computer program code of application software 206 operable with data elements 208. As shown in FIG. 3, a map of the memory in use is illustrated. A sound recognition software 206a is used to recognise a target sound, by comparing detected sounds to one or more sound models 208a stored in the memory 204. The sound model(s) 208a may be associated with one or more target sounds (which may be for example, a breaking glass sound, a smoke alarm sound, a baby cry sound, a sound indicative of an action being performed, etc.).

A context determination software 206b handles determination as to whether a context has been fulfilled by detection of particular sound events and/or scenes, such as those identified above, optionally in combination with other factors such as a geolocation or a time of day. This context determination software 206b is enabled by one or more context models 208b, developed to identify a context in terms of the relation or relations between particular sound events and/or scenes characterising a particular context.

Assistant software 206c manages response to fulfilment of a context. So, in response to a particular context being fulfilled, the assistant software responds by generating an assistive output. This could, for example, be a signal to a user, such as a display element, an audible output, a haptic stimulation or a remote alert. On the other hand, or in addition, it could be an electrical or other signal, for receipt by a cooperative device, to actuate another device such as an electrical switch. It could also be a telecommunication, such as a message or an initiation of a telephonic communication session.

User interface software 206d initiates the generation of a user interface for invitation to a user to make user input actions. Such a user interface may take a variety of forms. So, for example, a user interface may comprise a graphical user interface, providing display elements which invite user input action, such as the selection of on-screen buttons or the input of information into designated on-screed input fields. On the other hand, or in addition, a user interface may be audio-based. In such a case, the user interface software 206d is capable of receiving, and interpreting, speech audio and translating the same into data input for controlling other aspects of the implementation. In that case, the user interface software 206d may be operable to generate computer synthesised speech output, for interaction with a user.

The user interface software 206d, however it is implemented, is supported by user interface data 208d, which stores information from which the user interface can be implemented.

The computing device 102 may comprise one or more input device e.g. physical buttons (including single button, keypad or keyboard) or physical control (including rotary knob or dial, scroll wheel or touch strip) 210 and/or microphone 212. The computing device 102 may comprise one or more output device e.g. speaker 214 and/or display 216. It will be appreciated that the display 216 may be a touch sensitive display and thus act as an input device.

The computing device 102 may also comprise a communications interface 218 for communicating with one or more controllable devices 108 and/or the sound recognition device 104. The communications interface 218 may comprise a wired interface and/or a wireless interface.

As shown in FIG. 3, the computing device 102 may store the sound models locally (in memory 204) and so does not need to be in constant communication with any remote system in order to identify a captured sound. Alternatively, the storage of the sound model(s) 208a is on a remote server (not shown in FIG. 2) coupled to the computing device 102, and sound recognition software 206 on the remote server is used to perform the processing of audio received from the computing device 102 to recognise that a sound captured by the computing device 102 corresponds to a target sound. This advantageously reduces the processing performed on the computing device 102.

Sound Model and Identification of Sound Events and/or Scenes

A sound model 208a associated with a sound event and/or scene is generated based on processing a captured sound corresponding to the sound event and/or scene class. Preferably, multiple instances of the same sound are captured more than once in order to improve the reliability of the sound model generated of the captured sound event and/or scene class.

In order to generate a sound model the captured sound event and/or scene class(es) are processed and parameters are generated for the specific captured sound event and/or scene class. The generated sound model comprises these generated parameters and other data which can be used to characterise the captured sound event and/or scene class.

There are a number of ways a sound model associated with a target sound class can be generated. The sound model for a captured sound may be generated using machine learning techniques or predictive modelling techniques such as: hidden Markov model, neural networks, support vector machine (SVM), decision tree learning, etc.

The applicant's PCT application WO2010/070314, which is incorporated by reference in its entirety, describes in detail various methods to identify sounds. Broadly speaking an input sample sound is processed by decomposition into frequency bands, and optionally de-correlated, for example, using PCA/ICA, and then this data is compared to one or more Markov models to generate log likelihood ratio (LLR) data for the input sound to be identified. A (hard) confidence threshold may then be employed to determine whether or not a sound has been identified; if a "fit" is detected to two or more stored Markov models then preferably the system picks the most probable. A sound is "fitted" to a model by effectively comparing the sound to be identified with expected frequency domain data predicted by the Markov model. False positives are reduced by correcting/updating means and variances in the model based on interference (which includes background) noise.

It will be appreciated that other techniques than those described herein may be employed to create a sound model.

The sound recognition system may work with compressed audio or uncompressed audio. For example, the time-frequency matrix for a 44.1 KHz signal might be a 1024 point FFT with a 512 overlap. This is approximately a 20 milliseconds window with 10 millisecond overlap. The resulting 512 frequency bins are then grouped into sub bands, or example quarter-octave ranging between 62.5 to 8000 Hz giving 30 sub-bands.

A lookup table can be used to map from the compressed or uncompressed frequency bands to the new sub-band representation bands. For the sample rate and STFT size example given the array might comprise of a (Bin size÷2)×6 array for each sampling-rate/bin number pair supported. The rows correspond to the bin number (centre)–STFT size or number of frequency coefficients. The first two columns determine the lower and upper quarter octave bin index numbers. The following four columns determine the proportion of the bins magnitude that should be placed in the corresponding quarter octave bin starting from the lower quarter octave defined in the first column to the upper quarter octave bin defined in the second column. e.g. if the bin overlaps two quarter octave ranges the 3 and 4 columns will have proportional values that sum to 1 and the 5 and 6 columns will have zeros. If a bin overlaps more than one sub-band more columns will have proportional magnitude values. This example models the critical bands in the human auditory system. This reduced time/frequency representation is then processed by the normalisation method outlined. This process is repeated for all frames incrementally moving the frame position by a hop size of 10 ms. The overlapping window (hop size not equal to window size) improves the time-resolution of the system. This is taken as an adequate representation of the frequencies of the signal which can be used to summarise the perceptual characteristics of the sound. The normalisation stage then takes each frame in the sub-band decomposition and divides by the square root of the average power in each sub-band. The average is calculated as the total power in all frequency bands divided by the number of frequency bands. This normalised time frequency matrix is the passed to the next section of the system where a sound recognition model and its parameters can be generated to fully characterise the sound's frequency distribution and temporal trends.

The next stage of the sound characterisation requires further definitions.

A machine learning model is used to define and obtain the trainable parameters needed to recognise sounds. Such a model is defined by:

- a set of trainable parameters $\theta$, for example, but not limited to, means, variances and transitions for a hidden Markov model (HMM), support vectors for a support vector machine (SVM), weights, biases and activation functions for a deep neural network (DNN),
- a data set with audio observations o and associated sound labels l, for example a set of audio recordings which capture a set of target sounds of interest for recognition such as, e.g., baby cries, dog barks or smoke alarms, as well as other background sounds which are not the target sounds to be recognised and which may be adversely recognised as the target sounds. This data set of audio observations is associated with a set of labels l which indicate the locations of the target sounds of interest, for example the times and durations where the baby cry sounds are happening amongst the audio observations o.

Generating the model parameters is a matter of defining and minimising a loss function $\mathcal{L}(\theta|o,l)$ across the set of audio observations, where the minimisation is performed by means of a training method, for example, but not limited to, the Baum-Welsh algorithm for HMMs, soft margin minimisation for SVMs or stochastic gradient descent for DNNs.

To classify new sounds, an inference algorithm uses the model to determine a probability or a score $P(C|o,\theta)$ that new incoming audio observations o are affiliated with one or several sound classes C according to the model and its parameters $\theta$. Then the probabilities or scores are transformed into discrete sound class symbols by a decision method such as, for example but not limited to, thresholding or dynamic programming.

The models will operate in many different acoustic conditions and as it is practically restrictive to present examples that are representative of all the acoustic conditions the system will come in contact with, internal adjustment of the models will be performed to enable the system to operate in all these different acoustic conditions. Many different methods can be used for this update. For example, the method may comprise taking an average value for the sub-bands, e.g. the quarter octave frequency values for the last T number of seconds. These averages are added to the model values to update the internal model of the sound in that acoustic environment.

In embodiments whereby the computing device 102 performs audio processing to recognise a target sound in the monitored environment 100, this audio processing comprises the microphone 212 of the computing device 102 capturing a sound, and the sound recognition 206a analysing this captured sound. In particular, the sound recognition 206a compares the captured sound to the one or more sound models 208a stored in memory 204. If the captured sound matches with the stored sound models, then the sound is identified as the target sound.

A sequence of identified target sounds can thus be passed to the sequence to sequence model 206b for processing in the context of controlling navigation of a document 208c being supported by the browser 206c.

In this disclosure, target sounds of interest are non-verbal sounds. A number of use cases will be described in due course, but the reader will appreciate that a variety of non-verbal sounds could operate as triggers for navigation actions. The present disclosure, and the particular choice of examples employed herein, should not be read as a limitation on the scope of applicability of the underlying concepts.

Context Determination

The resulting sequence of non-verbal sound identifiers generated by the sound recognition 206a is passed to the context determination software 206b to determine if it characterises a context as defined in the context definition models 208b.

The context definition models 208b encode contexts as the relation or relations between sounds gathered in a set of sounds events and/or scenes. Relations can include, but are not limited to, the sequential order of occurrence of the sound events and/or scenes gathered in the considered set, their co-occurrence within a pre-defined time window, their distance in time, their probabilities of co-occurrences (n-grams) or any other forms of weighted or non-weighted graph. These context definitions can be acquired in numerous ways, for example but not limited to, by manual programming of an expert system, or by machine learning, for example but not limited to, using deep neural networks, decision trees, Gaussian mixture models or probabilistic n-grams.

It should be noted that, whereas the sound recognition process 206a converts an audio stream into one or more sound events and/or scenes (possibly with a time stamp), context recognition transforms a set of (possibly time-stamped) sound descriptors into a decision as to context. For example, context definition models may be defined as "having breakfast" or "leaving the house". Each of these will be stored as a set of sound events and/or scenes and their relation or relations. Detection that the relation or relations between sound events and/or scenes are satisfied within a set of sound events and/or scenes emanating from the sound recognition process will cause a decision that a particular identified context has been fulfilled.

Assistive Output

As a result of fulfilment of a particular identified context, an assistive output is generated. This assistive output may be mapped directly to the fulfilled context, the mapping being stored in memory.

The assistive output can be (non-exhaustively) synthetic speech audio output, an audible alarm, a graphical display, an electromagnetic communication to another device, a wire-bound electrical communication to another device, or a combination of any of the above.

Process

Figure 4:
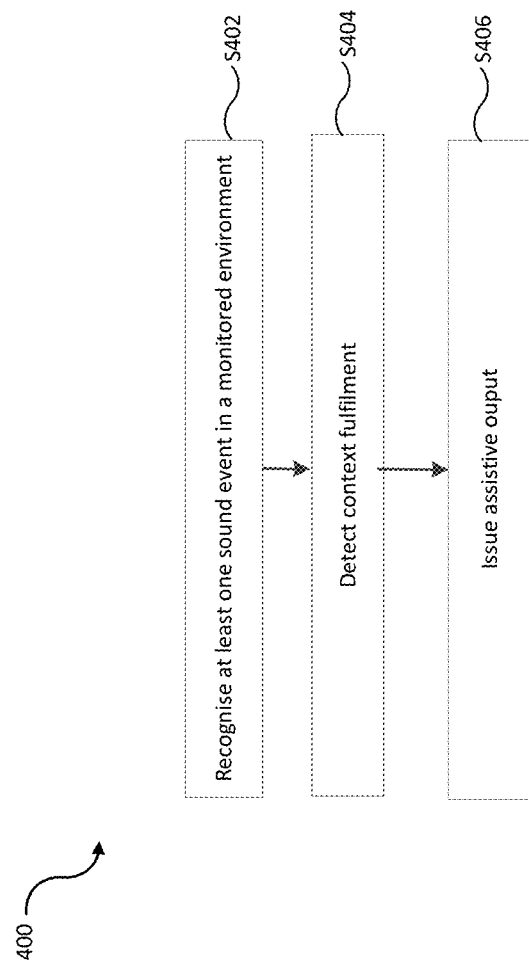
FIG. 4 is a flow chart illustrating a process to provide assistive output according to an embodiment.

FIG. 4 is a flow chart illustrating a process 400 to control a user interface of the computing device according to a first embodiment. The steps of the process 300 are performed by the processor 202.

At step S402, the processor 202 recognises one or more sound events and/or scenes in the monitored environment 100.

The microphone 212 of the computing device 102 is arranged to capture a sound in the monitored environment 100. Step S402 may be performed by the processor converting the captured sound pressure waves into digital audio samples and executing the sound recognition software 206 to analyse the digital audio samples (the digital audio samples may be compressed by the processor prior to this analysis being performed). In particular, the sound recognition software 206 compares the captured sound to the one or more sound models 208 stored in memory 204. If the captured sound matches with the stored sound models, then the captured sound is identified as a target sound. Alternatively, the processor 202 may transmit the captured sound via communications interface 218 to a remote server for processing to recognise whether the sound captured by the computing device 102 corresponds to a target sound. That is, the processor 202 may recognise a target sound in the monitored environment 100 based on receiving a message from the remote server that the sound captured by the computing device 102 corresponds to a target sound.

Alternatively, the microphone of the sound recognition device 104 may be arranged to capture a sound in the monitored environment 100 and process the captured sound to recognise whether the sound captured by the sound recognition device 104 corresponds to a target sound. In this example, the sound recognition device 104 is configured to transmit a message via the network 106 to the computing device 102 to alert the computing device 102 that a target sound has been detected. That is, the processor 202 may recognise a target sound in the monitored environment 100 based on receiving a message from the sound recognition device 104.

Regardless of where the processing of the captured sound is performed, the recognition of a target sound comprises recognising a non-verbal sound that may be generated in the environment of the sound capture device (the computing device 102 or the sound recognition device 104), for example a breaking glass sound, smoke alarm sound, baby cry sound, an onomatopoeic utterance, sound of a quiet house or sound of a railway station.

At step S404, the processor 202 determines fulfilment of a context, as defined by a context model 208b. This may be a continuous process—the processor may be configured to have a particular context model 208b loaded into short-term memory, and to be thus focused on the stream of sound events and/or scenes to detect fulfilment of sound relations indicative of that context. This can be established beforehand by user input action. So, for instance, a user may input to the device that there is a desire to be alerted as to the existence of a particular context or contexts. The user may further configure the device to determine if the alert should be set once, or each time the context is encountered.

The sequence of (possibly time-stamped) sound event and/or scene descriptors received by the context determination process is analysed as a set, where the set is not necessarily ordered. Context models are represented, for example, by graphs of sound event and/or scene co-occurrences, which can be decoded, e.g., by the Viterbi algorithm, but other models can also be used to learn the co-occurrence model from data, e.g., decision trees or deep neural networks.

Other approaches are also possible—on receipt of a particular sound event and/or scene, it may be possible for the processor 202 to search the context models to find candidate contexts for fulfilment, and then to monitor future sound events and/or scenes until one of those contexts is fulfilled.

At step S406, the processor 202 issues an assistive output or alert corresponding to the fulfilled context.

Use Cases

There follows a number of use cases designed to demonstrate the scope of the applicability of the above described technologies. None of these use cases should be construed as a limitation on potential applicability.

Contexts may be defined so as to monitor progress through and completion of a child's morning routine after rising from bed and through to departure for school. In this case, an audio input stream may be taken from a bathroom smart speaker. Using this speaker, it can be detected if particular individuals (such as children) have brushed their teeth, been to the toilet, and have washed their hands before going to school. A first context can thus be defined as an "in progress" context, in which a morning routine has been started but is incomplete. In response to detection of this context, information can be pushed to a smartphone (such as a parent's smartphone) so that the parent can be updated as to progress through the morning routine. A further alert can be sent to the smartphone when the morning routine has been detected to be complete, so as to enter a "ready for school" context.

In another scenario, contexts may be defined around home security. For instance, a home assistant may monitor for actions and events associated with human occupants of that house preparing themselves to leave for work. The home assistant may detect a sound event and/or scene associated with the occupant making final preparations to leave, such as putting on shoes or picking up a bunch of keys. The home assistant may be responsive to such an event and/or scene to determine if a precedent sequence of events and/or scenes matches an expected plurality of events and/or scenes associated with a morning routine. In response to any mismatch, an assistive output may ensue. So, for example, the home assistant may generate an output such as "Hang on, you forgot to fill the dishwasher" or "Wait, you left the tap on in the kitchen" in response to any such detected mismatch.

In another scenario, a system comprising a plurality of suitably configured devices can enable a monitoring of a user's exposure to audible noise. An objective to be fulfilled by such devices is to track, monitor and build better routines around daily noise exposure. Sounds collected, such as from a wearable device or from the user's smart headphones, can give an accurate record of exposed of a user to sound, including sound levels, time intensities and sound types. There is an acknowledged link between exposure to unwanted sound (noise) and mood. Noise can, in extremis trigger stress. The system can be configured to define a context associated with exceeding a daily dose of exposure to certain sounds, and to issue an alert to the user in response to entering this context.

In another scenario, a device can be configured to detect, as a sound event and/or scene, a period of relative silence in a home, albeit that a human user is present. The device can thus define a context around this period of silence, as an opportunity for the user to rest. An assistive output could be generated, in this case, as an audible synthesised speech output to the user, such as "You've been really busy, and it's only midday . . . how about some relaxing music?"

In another scenario, contexts may be defined around a healthy sleep cycle of a user. So, a smart speaker in a bedroom may be deployed to detect phases of a sleep cycle of a user, based on the intensity and occurrence of breathing sounds, movement in the bed and the time of day/night. Based on this, it can be determined when it is most appropriate or healthful for a user to be roused, using an audible output or, for instance, a trigger to a heating system to initiate a morning home heating cycle. Other outputs which could be triggered include sending a message to an automatic shower system to commence flow of water, so that the user can walk to a pre-warmed shower, to a coffee machine to commence brewing a pot of coffee, or commencement of other audio-visual effects such as a television presentation, email, browser, or other appropriate action on suitable devices.

A similar device can further be configured to determine if, on the basis of a sequence of detected sound events and/or scenes, a user has experienced a poor night of sleep. In response to detection of such a context, the device may be configured to trigger assistive outputs commensurate with this. So, the device could, for example, output audible synthesised speech to convey information to a user to encourage a restful morning routine (such as reading, music), or to connect to a family member for support. The device could, for instance, be used by an infirm or elderly person, particularly one with diminished speech powers, to alert a third party of a change of health condition or the need for assistance.

In a network of suitably cooperating devices, such as in a home, it may be possible to monitor sound events and/or scenes to enable users to share facilities more efficiently. So, for example, devices may be capable of monitoring if a bathroom is in use or not. A device may be configured to monitor for the vacancy of a bathroom, and to issue an audible output in response thereto. So, for instance, a user might, for example, initiate a monitoring process by issuing a spoken command to "Tell me when the bathroom becomes free", to which the device or devices are responsive to sound events and/or scenes associated with the opening of the bathroom door and other sounds which may indicate that the bathroom has become vacant. In that context, the device or devices will issue an audible synthesised speech output such as "the bathroom is free". Similarly, sounds associated with putting breakfast plates on a table could trigger an output of "Breakfast is nearly ready" to a child's bedroom.

A further facility may be provided, in an embodiment, to enable a user to configure a device to operate in a particular manner. So, for example, a device may be receptive to user input action, such as spoken word user input action, as to how the user wishes to receive alerts in relation to the occurrence of particular contexts. For example, context detection can be switched on or off by a user, or monitoring for a particular context can be enabled or disabled. Further, it can be configured as to whether an occurrence of a context will give rise to an alert once, a predetermined number of times (such as a 'snooze' function), or each time it arises.

In the context model(s), relations between sounds can be augmented with relations to other information items corresponding to the sounds. For instance, the occurrence of a sound, in space or time, can be recorded as part of a sound event. Using the identity of the sound event, and optionally the time at which it takes place or the location at which it takes place, further conclusions can be reached as to an identifiable context to be defined in a context model. So, for example, sounds associated with preparation or consumption of a breakfast may be related more strongly with a context described as "having breakfast" if they occur in the morning or in a particular location in a house associated with breakfast, such as a kitchen or breakfast room. Likewise, sounds associated with a context described as "having dinner" may be of strengthened relation to that context if they occur at particular times or in a location (e.g. a dining room) associated with that context.

Overview

Figure 5:
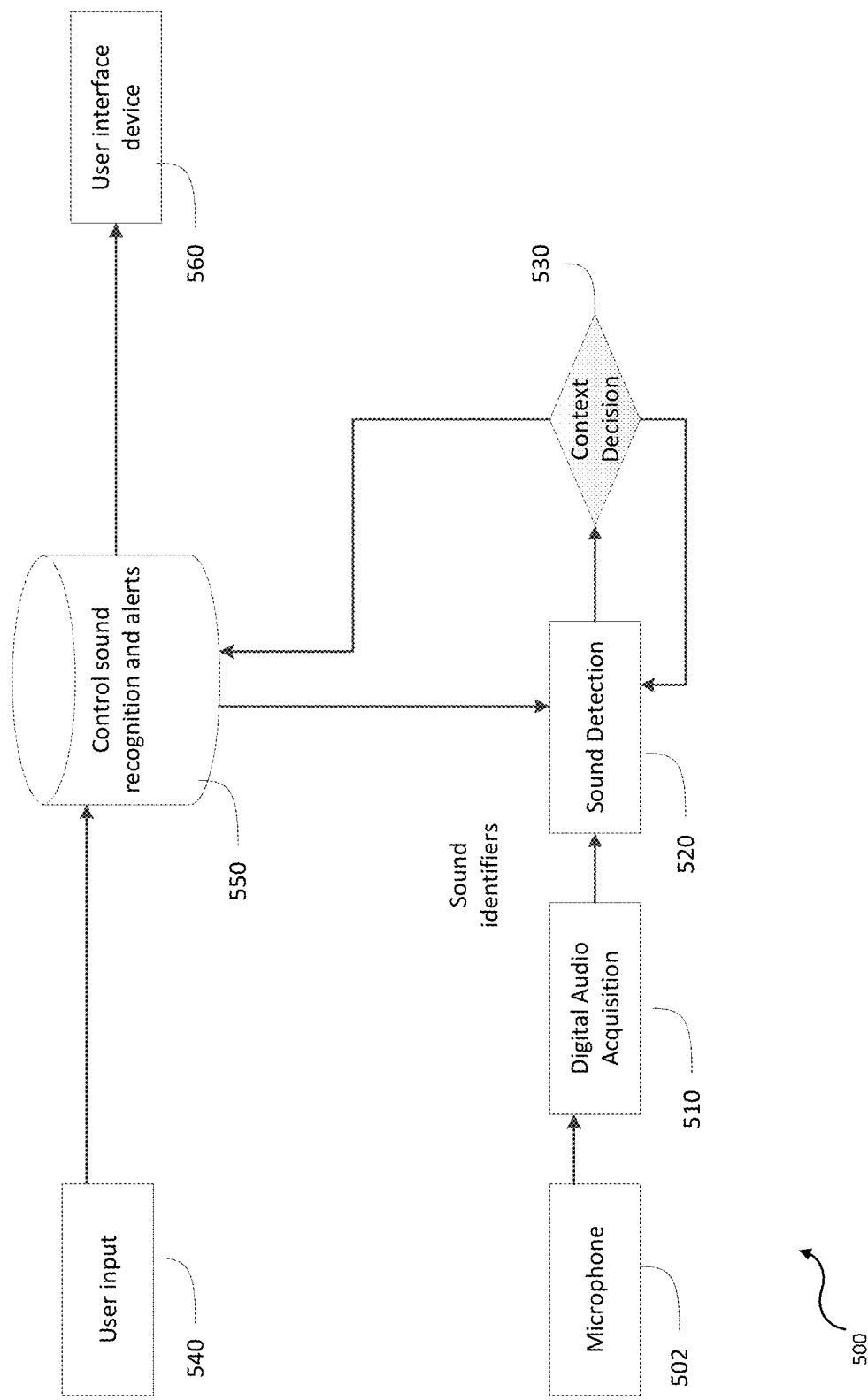
FIG. 5 is a process architecture diagram illustrating an implementation of an embodiment and indicating function and structure of such an implementation.

As shown in FIG. 5, the overall structure and function of a system 500 designed to implement the above use cases is presented. In this case, a first digital audio acquisition block 510 receives audio signal from a microphone 502, and produces a sequence of waveform samples. These samples are passed to a sound detection block 520, which produces sound identifiers for each sound event and/or scene detectable on the waveform samples. Each sound identifier comprises information identifying the sound event and/or scene, i.e. what the sound is, whether it is starting or ending (or, in some cases, the duration of the event and/or scene), and the time of the event and/or scene.

The function of the sound detection block 520 is further configured by data held in a control sound recognition and alerts block 550, which itself is configured by user input action at a user interface 540. The typical user input action, in this embodiment, is to set an alert conditioned to an audio context. So, for example, the user may input a request that if sounds associated with the preparation of breakfast are identified, then an alert will be sent to the user's device 560 (which may be a smartphone, for instance).

So, suitably configured, the sound detection unit 520 is actively monitoring for the encountering of sound events and/or scenes which, because they relate in a particular way, identify with the context of breakfast being prepared. Then, a continuing decision 530 is taken as to whether the context has been fulfilled. If it has not been fulfilled, then the sound detection block 520 continues to detect sounds. If it has been fulfilled, then this decision is relayed back to the control sound recognition and alerts block 550 and the alert, associated with that context, is issued to the user's device 560.

Separate computers can be used for the various stages of processing. So, for instance, user input can be at a first device, which may be a smartphone. Sound detection and configuration of context detection may be carried out at another device. All functions illustrated in FIG. 5 could in fact be carried out at separate computers, suitably networked with each other. Alternatively, all of the above functions can be provided on the same computing device.

Aspects of embodiments disclosed herein can provide certain advantages in the utility of computing devices to users. For instance, a combination of artificial intelligence used in automatic sound event and/or scene recognition system, combined with a context detection system can enable increased relevance of alerts to context. So, for example, an alert can be associated with a context, rather than a particular time, thus allowing the system to adapt to the user, rather than rigidly adhering to a real-time schedule. Embodiments also can relieve human attention from monitoring for completion of a detectable series of events and/or scenes, identifiable by sound event and/or scene occurrence. Embodiments can also augment human capabilities to monitor that a series of sound events and/or scenes and/or scenes indicative of context have occurred in many rooms, occurred while sleeping or occurred across a variety of sound sensors, which are tasks that humans would not be able to perform because they are not able to place themselves at several monitoring points at the same time or within a short period of time.

The invention claimed is:

1. A computer device operable to generate an assistive output on the basis of a context determination, the device comprising:
   an audio stream acquisition unit for acquiring a stream of audio samples;
   a sound detector for detecting, from the stream of audio samples, a plurality of non-verbal sound events and/or scenes;
   a sound processor for processing the plurality of non-verbal sound events and/or scenes to determine a sound event and/or scene identifier for each of the plurality of non-verbal sound events and/or scenes on the basis of the plurality of non-verbal sound events and/or scenes, each of the plurality of non-verbal sound event and/or scene identifiers identifying a non-verbal sound event and/or scene from the stream of audio samples;
   an activity context determiner for determining, on the basis of the plurality of determined non-verbal sound event and/or scene identifiers, that a particular activity context has been fulfilled, the activity context being associated with a state of completion of an activity comprising a plurality of associated actions or events, where said fulfilment of the particular activity context is defined by an activity context model for the particular activity context, wherein the activity context determiner is configured to: input the plurality of determined non-verbal sound event and/or scene identifiers into the activity context model for the particular activity context; and receive, from the activity context model, an indication that the particular activity context has been fulfilled, wherein the particular activity context is associated with a recommended user action; and
   an assistive output generator for generating an assistive output to a user for said particular activity context on the basis of the indication that the particular activity context has been fulfilled, the assistive output conveying assistive information to the user, the assistive information being operable to prompt the user to take the recommended user action.

2. A computer device in accordance with claim 1 and wherein the activity context determiner is operable to determine fulfilment of an activity context on the basis of detection of non-verbal sound event and/or scene identifiers related to that activity context.

3. A computer device in accordance with claim 1 and wherein the activity context determiner is operable to determine fulfilment of an activity context on the basis of a temporal measure, the temporal measure being a measure of an instance of a non-verbal sound event and/or scene in relation to real time or in respect of another non-verbal sound event and/or scene in combination with detection of one or more non-verbal sound event and/or scene identifiers.

4. A computer device in accordance with claim 1 and wherein the activity context determiner is operable to determine fulfilment of an activity context on the basis of a location measure in combination with detection of one or more non-verbal sound event and/or scene identifiers.

5. A computer device in accordance with claim 1 wherein the activity context determiner is operable to determine, on the basis of a plurality of activity context definitions, which if any are fulfilled by detected one or more non-verbal sound event and/or scene identifiers.

6. A computer device in accordance with claim 1, wherein the activity context model is implemented using machine learning.

7. A computer device in accordance with claim 1 wherein the activity context determiner comprises a decision tree.

8. A computer device in accordance with claim 1 wherein the activity context determiner comprises a neural network.

9. A computer device in accordance with claim 1 wherein the activity context determiner comprises a weighted graph model.

10. A computer device in accordance with claim 1 wherein the activity context determiner comprises a hidden Markov model.

11. A computer device in accordance with claim 1 wherein the assistive output generator is operable to output an alert signal on the basis of the fulfilled context.

12. A computer device in accordance with claim 11 wherein the alert signal comprises at least one of an audible alert, a visual alert, a haptic alert, and a remote alert.

13. A computer device in accordance with claim 1 wherein the assistive output generator is operable to output an assistive output associated with the fulfilled activity context.

14. A computer device in accordance with claim 1 and comprising a user interface unit operable to implement a user interface for receiving signals corresponding to user input actions, and wherein the activity context determiner is responsive to user input actions to associate a context with an assistive output.

15. A computer device in accordance with claim 1 and comprising a user interface unit operable to implement a user interface for receiving signals corresponding to user input actions, and wherein the activity context determiner is responsive to user input actions to associate fulfilment of an activity context with detection of one or more non-verbal sound identifiers.

16. A computer implemented method for generating an assistive output on the basis of a context determination, the method comprising:
 acquiring a stream of audio samples;
 detecting, from the stream of audio samples, one or more non-verbal sound events and/or scenes;
 processing the plurality of non-verbal sound events and/or scenes to determine a sound event and/or scene identifier for each of the plurality of non-verbal sound events and/or scenes on the basis of the plurality of non-verbal sound events and/or scenes, each of the plurality of non-verbal sound event and/or scene identifiers identifying a non-verbal sound event and/or scene from the stream of audio samples;
 determining, on the basis of the plurality of determined non-verbal sound event and/or scene identifiers, that a particular activity context has been fulfilled, where said fulfilment of the particular activity context is defined by an activity context model for the particular activity context, the activity context being associated with a state of completion of an activity comprising a plurality of associated actions or events, wherein said determining that the particular activity context has been fulfilled comprises: inputting the plurality of determined non-verbal sound event and/or scene identifiers into the activity context model for the particular activity context; and receiving, from the activity context model, an indication that the particular activity context has been fulfilled, wherein the particular activity context is associated with a recommended user action; and
 generating an assistive output to a user for said particular activity context on the basis of the indication that the particular activity context has been fulfilled, the assistive output conveying, to the user, assistive information operable to prompt the user to take the recommended user action.

17. A non-transitory computer readable medium storing computer executable instructions which, when executed by a general purpose computer, cause that computer to perform steps of:
 acquiring a stream of audio samples;
 detecting, from the stream of audio samples, one or more non-verbal sound events and/or scenes;
 processing the plurality of non-verbal sound events and/or scenes to determine a sound event and/or scene identifier for each of the plurality of non-verbal sound events and/or scenes on the basis of the plurality of non-verbal sound events and/or scenes, each of the plurality of non-verbal sound event and/or scene identifiers identifying a non-verbal sound event and/or scene from the stream of audio samples;
 determining, on the basis of the plurality of determined non-verbal sound event and/or scene identifiers, that a particular activity context has been fulfilled, where said fulfilment of the particular activity context is defined by an activity context model for the particular activity context, the activity context being associated with a state of completion of an activity comprising a plurality of associated actions or events, wherein said determining that the particular activity context has been fulfilled comprises: inputting the plurality of determined non-verbal sound event and/or scene identifiers into the activity context model for the particular activity context; and receiving, from the activity context model, an indication that the particular activity context has been fulfilled, wherein the particular activity context is associated with a recommended user action; and
 generating an assistive output to a user for said particular activity context on the basis of the indication that the particular activity context has been fulfilled, the assistive output conveying, to the user, assistive information operable to prompt the user to take the recommended user action.

* * * * *

UNITED STATES PATENT AND TRADEMARK OFFICE
CERTIFICATE OF CORRECTION

| | | |
|---|---|---|
| PATENT NO. | : 11,133,020 B2 | Page 1 of 1 |
| APPLICATION NO. | : 16/594274 | |
| DATED | : September 28, 2021 | |
| INVENTOR(S) | : Mitchell et al. | |

It is certified that error appears in the above-identified patent and that said Letters Patent is hereby corrected as shown below:

On the Title Page

Item [72], reads:
"Amoldas Jasonas, Cambridgeshire (GB)"
Should read:
--Arnoldas Jasonas, Cambridgeshire (GB)--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*